United States Patent [19]
Davis et al.

[11] Patent Number: 4,623,133
[45] Date of Patent: Nov. 18, 1986

[54] CLAMPING DEVICES FOR SPRING ASSEMBLIES

[75] Inventors: Geoffrey Davis; Graham K. Beal, both of Sheffield, England

[73] Assignee: British Steel Corporation, London, England

[21] Appl. No.: 690,588

[22] Filed: Jan. 11, 1985

[30] Foreign Application Priority Data

Jan. 12, 1984 [GB] United Kingdom ............... 8400802

[51] Int. Cl.$^4$ .............................................. F16F 1/30
[52] U.S. Cl. ..................................................... 267/53
[58] Field of Search ................... 267/51, 52, 53, 54 R, 267/54 A, 55

[56] References Cited

U.S. PATENT DOCUMENTS

| | | | |
|---|---|---|---|
| 1,642,547 | 9/1927 | Hill | 267/53 |
| 1,654,612 | 1/1928 | Siodla | 267/53 |
| 1,736,670 | 11/1929 | Schuttler | 267/53 X |
| 1,741,162 | 12/1929 | McGowen | 267/53 |
| 1,987,189 | 1/1935 | Geyer | 267/53 |
| 2,201,531 | 5/1940 | Geb | 267/53 X |

FOREIGN PATENT DOCUMENTS

| | | | |
|---|---|---|---|
| 199522 | 6/1923 | United Kingdom | 267/53 |
| 147083 | 4/1977 | United Kingdom . | |

Primary Examiner—Duane A. Reger
Attorney, Agent, or Firm—Bacon & Thomas

[57] ABSTRACT

A device for clamping together at least two leaves of a leaf spring assembly and a resilient plate member in superimposed interfacial contact comprises at least one clasp adapted to embrace the leaves and the resilient member. A closure plate or bar is secured to the free ends of the clasp to impose a clamping force on the members embraced by the clasp. The closure plate or bar is formed with a raised surface which co-operates with an adjacent surface of a member embraced by the clasp to permit angular movement of the clasp relative to the embraced members.

2 Claims, 4 Drawing Figures

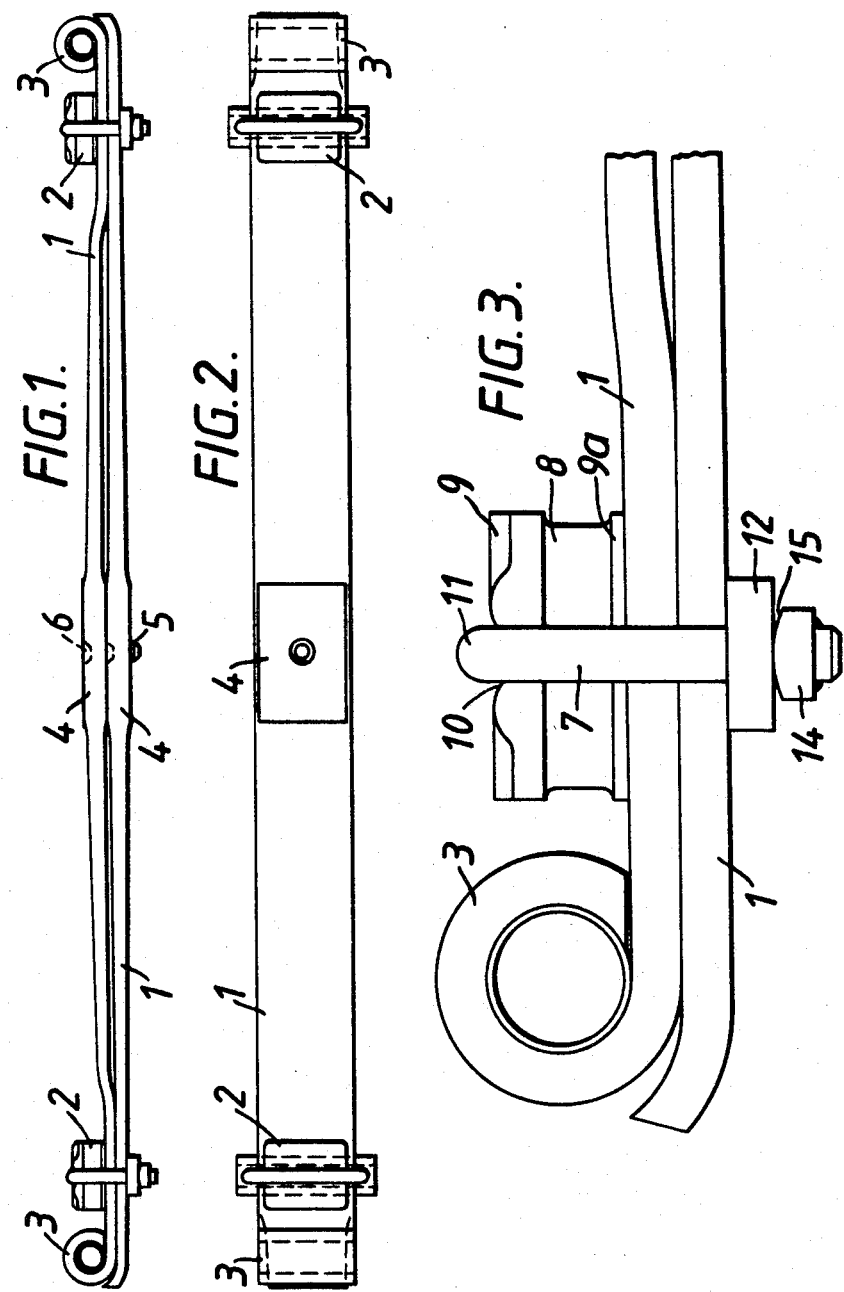

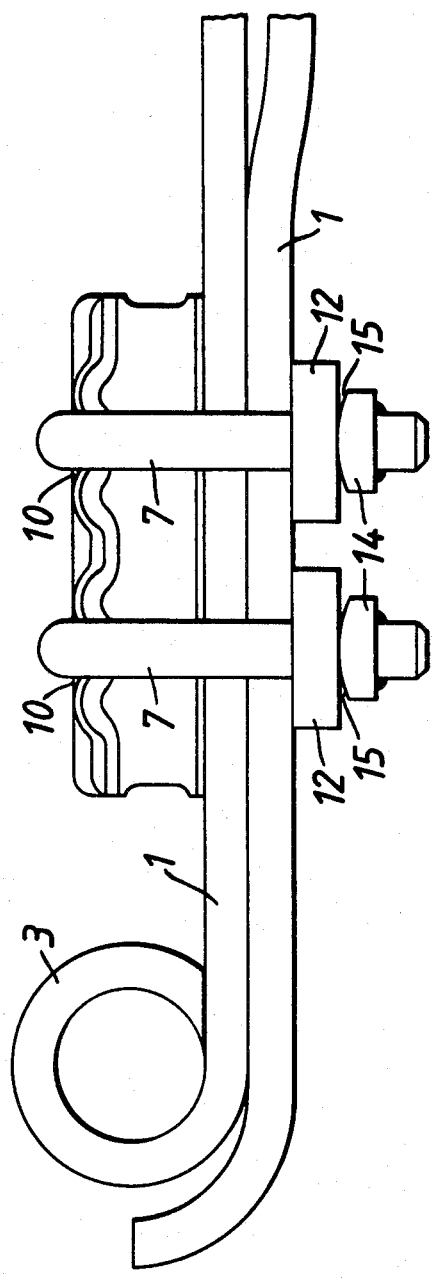

CLAMPING DEVICES FOR SPRING ASSEMBLIES

This invention relates to leaf spring assemblies and more particularly to devices for clamping individual leaf members of such assemblies in superimposed interfacial contact.

A device for clamping together individual leaves of a leaf spring assembly is known which comprises an elongate clasp defining a channel within which the individual leaves and a resilient rubber friction block or plate are retained. An end plate is secured to the clasp such that the rubber plate is compressed to exert a predetermined clamping force substantially perpendicular to the individual leaf springs. Thus the force exerted on all adjoining pairs of contacting surfaces is substantially the same and is independent of operational loading, mutual displacement of the leaves being restrained only by frictional forces generated at the contact surfaces. In this device, relative longitudinal displacement between the spring leaves and the resilient rubber plate is absorbed by elastic shear deformation of the rubber plate. The life of the rubber plate and thus the clamping device is related, therefore, to the extent and frequency of the shear forces imposed and one object of the present invention is to reduce these forces by reducing the relative longitudinal movement which occurs between the resilient plate member and the adjacent leaf spring.

According to the present invention in one aspect there is provided a device for clamping together at least two leaf members of a leaf spring assembly and a resilient member in superimposed interfacial contact, comprising a U-shaped clasp formed from metal rod, bar or the like adapted to embrace the leaf members and the resilient member, a metal end plate or bar connected to an adjacent leaf member and including apertures through which the free ends of the clasp can protrude, and a closure plate or bar secured to the free ends of the clasp to impose a predetermined clamping force on the leaf members and the resilient member and formed with an arcuate surface which bears against the face of the end plate or bar remote from the leaf member to which it is attached.

According to the present invention in another aspect there is provided a leaf spring assembly which comprises a plurality of leaf members clamped together in superimposed interfacial contact by at least two spaced apart clamping devices located one towards each end of the assembly, each clamping device comprising a U-shaped clasp formed from metal rod, bar or the like which is adapted to embrace the leaf members and a resilient member positioned between the arch of the clasp and an adjacent leaf member or between two adjacent leaf members, a metal end plate or bar connected to the leaf member most remote from the arch of the clasp and including apertures through which the free ends of the clasp protrude, and a closure plate or bar secured to the free ends of the clasp to impose a clamping force on the leaf members and the resilient member and formed with an arcuate surface which bears against the face of the end plate or bar remote from the leaf member to which the end plate or bar is attached.

The resilient member preferably comprises a layer of rubber vulcanised to a metal plate. In a preferred arrangement the rubber layer is located adjacent the arch of the clasp with its metal plate in direct contact with the clasp. In this arrangement the free surface of the metal plate may be recessed to provide a seating for the arch of the clasp.

The closure member may be formed with apertures through which the free ends of the U-shaped clasp protrude, these ends then being welded to the undersurface of the closure plate. Alternatively the free ends of the clasp may be provided with threads to receive bolts for securing the closure member to the U-shaped clasp.

According to the present invention in a further aspect, there is provided a device for clamping together at least two leaves of a leaf spring assembly and a resilient plate member in superimposed interfacial contact, the device comprising a U-shaped clasp adapted to embrace the leaves and the resilient member and a closure plate or bar capable of being secured to the free ends of the clasp to impose a clamping force on the members embraced by the clasp, the closure plate or bar being formed with a raised surface which co-operates with an adjacent surface of a member embraced by the clasp to permit angular movement of ths clasp relative to the embraced members.

The invention will now be described by way of example only with reference to the accompanying diagrammatic drawings in which:

FIG. 1 is a side elevational view of a leaf spring assembly retained by clamping devices in accordance with the invention;

FIG. 2 is a plan view from above of the assembly illustrated in FIG. 1;

FIG. 3 is a detail to an enlarged scale of the assembly illustrated in FIG. 1; and FIG. 4 is a side elevational view of an alternative clamping device in accordance with the invention.

The leaf spring assembly illustrated in FIGS. 1 and 2 comprises two individual, parabolically tapered leaf springs, held together by clamping devices 2 in accordance with the invention. The uppermost leaf spring is conventionally formed at its ends with eyes 3 and both springs have flat central portions 4 which cooperate through complementary studs 5 and dimples 6 to locate one leaf spring with respect to the other.

As will be seen more clearly from FIG. 3, each clamping device includes a U-shaped clasp 7 formed from metal rod, bar or the like which embraces the individual leaves 1 of the leaf spring assembly and a friction block or layer of resilient material 8; the resilient material is formed conventionally of rubber vulcanised to thin metal strips 9, and 9a. The metal strip 9 has formed in its free surface a recess 10 within which seats the arch 11 of the clasp 7.

Located below the leaf springs 1 is a metal end plate 12 formed with apertures through which the free ends of the clasp 7 protrude. The apertures are dimensioned to permit movement of the clasp 7 relative to the end plate 12. The end plate is attached to the lower-most leaf member by means of, for example, a rivet.

The assembly of the leaf members 1, the resilient friction block 8 and the end plate 12 is retained within the clasp 7 by means of a closure bar or plate 14 secured by welding to each free end of the clasp. During the welding operation, the leaf members 1 and the resilient friction block 8 are urged into contact with one another by a conventional loading tool to achieve the desired clamping force on assembly of the clamp. As an alternative to welding, each free end of the clasp may be threaded to accept bolts to locate the closure path on the clasp.

As will be apparent from FIG. 3, the surface 15 of the closure plate 14 in contact with the end plate 12 is curved in the transverse direction of the leaves 1 to facilitate pivotal movement of one with respect to the other.

On assembly of the clamp, the pressure exerted on the leaf members 1 is substantially constant and the leaf members are restrained against mutual displacement in the longitudinal direction of the spring assembly only by frictional forces generated between the contact faces. In use, relative movement occurs between the individual leaf members as the vehicle in which the leaf spring assembly is installed travels over a road surface or track. Relative movement in the longitudinal direction between the uppermost leaf member and the resilient friction block 8 is, at least in part, accommodated through angular movement of the clasp 7 with respect to the assembled members and the end plate 12 about the arcuate surface 15 of the closure plate 14. This angular movement is permitted by the apertures formed in the end plate 12 and is assisted by the recess 10 set in the upper surface of the metal strip 9 and by the cross-section of the clasp 7 itself. Thus, shear forces which would, in conventional clamping devices, be imposed in the resilient friction block 8 upon relative movement between the member and the adjacent leaf are in certain cases eliminated and in other cases reduced.

In the embodiment illustrated in FIG. 4, the clamping device 2 comprises two clasp assemblies each comprising a clasp 7, an end plate 12 and a closure plate 14 positioned about an elongate resilient friction block 8.

It is to be understood that the foregoing is merely exemplary of apparatus in accordance with the invention and that various modifications can be made to the apparatus without departing from the scope of the invention.

We claim:

1. A leaf spring assembly comprising a plurality of leaf members clamped together in superimposed interfacial contact by at least two spaced apart clamping devices located one towards each end of the assembly, each clamping device comprising:
   (i) A U-shaped clasp formed from metal rod, bar or the like;
   (ii) a friction block of vulcanised rubber;
   (iii) a flat metal plate bonded to the lower surface of the vulcanised rubber block and formed with a lower surface which makes full facial contact with the adjoining surface of the uppermost leaf of the assembly;
   (iv) a metal plate bonded to the upper surface of the vulcanised rubber block which lies in contact with the underside of the arch of the U-shaped clasp;
   (v) a metal end plate secured to the exposed surface of the lowermost leaf of the assembly and formed with apertures so dimensioned that the arms of the clasp protrude therethrough with a clearance defined between the clasp arms and portions of the metallic boundaries of the apertures;
   (vi) a closure plate having an arcuate upper surface which bears against the exposed surface of the end plate and formed with apertures through which the clasp arms protrude;
   (vii) and means for securing the closure plate to the free ends of the clasp arms whereby a desired clamping force is imposed on the members embraced by the clasp.

2. An assembly as claimed in claim 1 wherein the upper surface of the metal plate bonded to the upper surface of the vulcanised rubber block is recessed to provide a seating for the arch of the clasp.

* * * * *